US009684221B2

(12) United States Patent
Luo et al.

(10) Patent No.: US 9,684,221 B2
(45) Date of Patent: Jun. 20, 2017

(54) BROADBAND TERAHERTZ GENERATION OF METAMATERIALS

(71) Applicants: Liang Luo, Ames, IA (US); Jigang Wang, Ames, IA (US); Thomas Koschny, Ames, IA (US); Martin Wegener, Karlsruhe (DE); Costas M. Soukoulis, Ames, IA (US)

(72) Inventors: Liang Luo, Ames, IA (US); Jigang Wang, Ames, IA (US); Thomas Koschny, Ames, IA (US); Martin Wegener, Karlsruhe (DE); Costas M. Soukoulis, Ames, IA (US)

(73) Assignees: Iowa State University Research Foundation, Inc., Ames, IA (US); Martin Wegener, Karlsruhe (DE)

( * ) Notice: Subject to any disclaimer, the term of this patent is extended or adjusted under 35 U.S.C. 154(b) by 0 days.

(21) Appl. No.: 14/989,565

(22) Filed: Jan. 6, 2016

(65) Prior Publication Data
US 2016/0197447 A1 Jul. 7, 2016

Related U.S. Application Data

(60) Provisional application No. 62/100,382, filed on Jan. 6, 2015.

(51) Int. Cl.
*G02F 1/225* (2006.01)
(52) U.S. Cl.
CPC .......... *G02F 1/225* (2013.01); *G02F 2203/13* (2013.01)
(58) Field of Classification Search
USPC ................. 250/504 R, 493.1, 494.1
See application file for complete search history.

(56) References Cited

U.S. PATENT DOCUMENTS

| 7,864,394 B1* | 1/2011 | Rule | ............... B82Y 20/00 |
| | | | 359/241 |
| 8,269,168 B1* | 9/2012 | Axelrod | ............ H01Q 15/0086 |
| | | | 250/336.1 |

OTHER PUBLICATIONS

Moser, H.O. et al.; Terahertz Response of a Microfabricated Rod-Split-Ring-Resonator Electromagnetic Metamateria; Physical Review Letters; Feb. 18, 2005; 4 pages; PRL 94, 06391 (2005), The American Physical Society.
Luo, Liang et al.; Broadband terahertz generation from metamaterials; Nature Communications Article; Published Jan. 8, 2014; 6 pages; DOI:10.1038/ncomms4055.

* cited by examiner

*Primary Examiner* — Kiet T Nguyen
(74) *Attorney, Agent, or Firm* — Reinhart Boerner Van Deuren P.C.

(57) ABSTRACT

Provided are systems and methods to generate single-cycle THz pulses from a few tens of nanometers thin layer of split ring resonators (SRRs) via optical rectification of femtosecond laser pulses. The emitted THz radiation, with a spectrum ranging from about 0.1 to 4 THz, arises exclusively from pumping the magnetic-dipole resonance of SRRs around 200 THz. This resonant enhancement, together with pump polarization dependence and power scaling of the THz emission, underpins the nonlinearity from optically induced circulating currents in SRRs, with a huge effective nonlinear susceptibility of $0.8 \times 10^{-16}$ m$^2$/V that far exceeds surface nonlinearities of both thin films and bulk organic/inorganic crystals and sheet nonlinearities of non-centrosymmetric materials such as ZnTe.

19 Claims, 7 Drawing Sheets

BROADBAND TERAHERTZ GENERATION OF METAMATERIALS

CROSS-REFERENCE TO RELATED PATENT APPLICATION

This patent application claims the benefit of U.S. Provisional Patent Application No. 62/100,382, filed Jan. 6, 2015, the entire teachings and disclosure of which are incorporated herein by reference thereto.

STATEMENT REGARDING FEDERALLY SPONSORED RESEARCH AND DEVELOPMENT

This invention was made in part with Government support under Grant Number DE-ACO2-07CH11358 awarded by the Department of Energy. The Government has certain rights in this invention.

FIELD OF THE INVENTION

This invention generally relates to terahertz pulse generation, and more particularly to broadband terahertz generation of metamaterials.

BACKGROUND OF THE INVENTION

The terahertz (THz, $10^{12}$ cycles per second, $10^{12}$ Hz) region or gap, which lies in between the infrared and millimeter spectral regions typically from 100 GHz to 15 THz, poses one of the most demanding challenges for technology and fundamental science today. Indeed, it is one of the least explored, yet most technologically transformative spectral regions.

One key current challenge is the lack of efficient and compact THz emitters/detectors with a broadband and gapless spectrum that can be tailored for various pump photon energies. The lacking of the efficient light sources and detectors is what makes the THz physics one of the least-explored parts in the entire electromagnetic spectrum. This is despite the fact that the technological demand underlies the entire field of sensing and communications to (1) push the gigahertz switching speed limit of today's logic/memory/wireless communication devices into the THz, and (2) extend the conventional visible/infrared spectrum of today's security screening/drug detection/biometrics/DNA chip applications to the THz spectrum, which is generally more transparent and has more distinct spectral signatures suitable for non-invasive and label-free evaluation. One key challenge for most applications is to develop ultrafast few-cycle THz pulses with extraordinary stability and gapless spectrum covering the entire THz region.

The invention provides such a THz pulse generators/sensors. These and other advantages of the invention, as well as additional inventive features, will be apparent from the description of the invention provided herein.

BRIEF SUMMARY OF THE INVENTION

In one embodiment of the present invention, single-cycle THz pulses are generated from a few tens of nanometers thin layer of split ring resonators (SRRs) via optical rectification of femtosecond laser pulses. The emitted THz radiation, with a spectrum ranging from about 0.1 to 4 THz, arises exclusively from pumping the magnetic-dipole resonance of SRRs around 200 THz. This resonant enhancement, together with pump polarization dependence and power scaling of the THz emission, underpins the nonlinearity from optically induced circulating currents in SRRs, with a huge effective nonlinear susceptibility of $0.8 \times 10^{-16}$ $m^2/V$ that far exceeds surface nonlinearities of both thin films and bulk organic/inorganic crystals and sheet nonlinearities of non-centrosymmetric materials such as ZnTe.

In such an embodiment efficient broadband single-cycle THz pulse generation from a single layer of SRR emitters has been demonstrated for the first time. Such efficient and compact THz source is expected to be useful for many applications including, but not limited to, e.g., integrated nanophotonics and nanoelectronics circuits, high-speed information and communication technology, ultra-small non-invasive biological and medical evaluation device, etc.

Embodiments of the present invention provide compelling opportunities to advance one of the most poorly-addressed territories in the gap of today's photonics and electronics technologies of ultrafast and ultrabroadband THz generation. Although some theoretical studies have been underway, the experiments for demonstrating a wide range of the predicted THz generation behaviors have lagged behind. Embodiments of the present invention, however, push the limits of current communication and sensing technologies, which are recurring topics of interest as noted from the scientific research. In addition to the above examples of applications, these embodiments are also applicable for homeland security, real-time biometrics, non-invasive detection of, e.g., hazardous-gas, explosives, and narcotics, extremely high-speed information and communications technology, biology and medical sciences.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The challenge to develop THz light sources and control THz radiation merges different disciplines of fundamental science and technology, from ultrafast nonlinear optics, condensed matter and materials physics to optoelectronics and microwave photonics. The emerging THz technologies, such as quantumcascade lasers, ultrafast nonlinear optical rectification and photoconductive switches, have enabled various THz spectroscopy/imaging/sensing developments and offered perspectives, amongst others, for pushing the gigahertz switching speed limit of today's logic/memory/wireless communication devices into the THz regime.

Recently, the development of metamaterials with THz electromagnetic resonances not only has significantly enhanced light-matter coupling in the THz range but has also led to tunability, which is rarely possible in natural materials, by incorporating semiconductor substrates sensitive to, e.g., electrical gating or optical pumping. The essential building blocks of these complex artificial photonic structures are man-made "magnetic atoms" such as the SRRs, which can sustain circulating ring currents, leading to "artificial magnetism." This manifests itself in the form of distinctive magnetic-dipole resonances that can be tailored from the THz to the near-infrared and visible regions. While design, fabrication, and control of metamaterials have been actively pursued, THz generation has never been reported for any type of metamaterial.

A major recent progress for developing broadband THz sources is based on nonlinear optical rectifications in inorganic crystals such as ZnTe/GaP/GaAs/GaSe/DAST/LiNbO$_3$, pumped by femtosecond laser pulses and field-resolved detection via electro-optic sampling using similar crystals. However, issues are strongly absorbing longitudinal optical phonon bands and subtle phase matching conditions in these crystals. Normally, these lead to a gap in the THz spectrum in the Reststrahlen region and restrict the pump photon energy to a fixed narrow range in order to increase the coherent length via matching phase velocity of the THz emission and group velocity of the optical pump. Some other nonsolid-state nonlinear media have also been explored although they mostly suffer from either poor stability or limited bandwidth, e.g., ambient air-plasma generation normally with large shot-by-shot fluctuations.

Recently, there have been explorations for thin THz emitter/detector crystals of 10-30 μm thickness to leverage above restrictions. However, the relatively small nonlinear susceptibility of inorganic emitters limit the THz emission intensity. In these regards, investigating single nanometer layer metamaterials exhibiting artificial optical magnetism can meet the urgent demand for new nonlinear materials for optical rectification free from either phase matching limitation or spurious THz phonons. This is due in part to the coexistence of resonant nonlinearity from magnetic dipoles of optical frequencies and local electric field enhancement in the narrow gap regions of the structure, which allow efficient and broadband THz radiation from emitters of strongly reduced thickness.

In addition, tuning the magnetic resonances of the metamaterial emitters allows for matching to essentially any desired pump photon energy without limitations arising from coherent length or phase-matching issues. For example, this allows for integrating THz optoelectronics with high-speed telecommunications as the 1.3-1.5 micrometer range is neither ideal for ZnTe-based technologies nor for others. However, optical rectification of metamaterials for THz science and technology represents an unexplored territory.

Embodiments of the present invention demonstrate efficient THz emission up to 4 THz from optical rectification of a single SRR layer of 40 nm in thickness, based on resonant photoexcitation of the magnetic-dipole resonance centered at around 1500 nm (200 THz) wavelength and using near-infrared laser pulses of 140 fs in duration. The strong THz emission intensity from the metamaterial emitter is on the same order as that from ZnTe crystals that are thousand times thicker, revealing a gigantic resonant sheet nonlinear susceptibility of SRRs ~0.8×10$^{-16}$ m$^2$/V, which is three orders of magnitude higher than the typical surface and sheet values of bulk crystals and thin films. The demonstrated approach can potentially produce a gapless spectrum covering the entire THz region using shorter pump pulses without limitations of the Reststrahlen band in inorganic THz emitters/sensors.

Figure 1A:
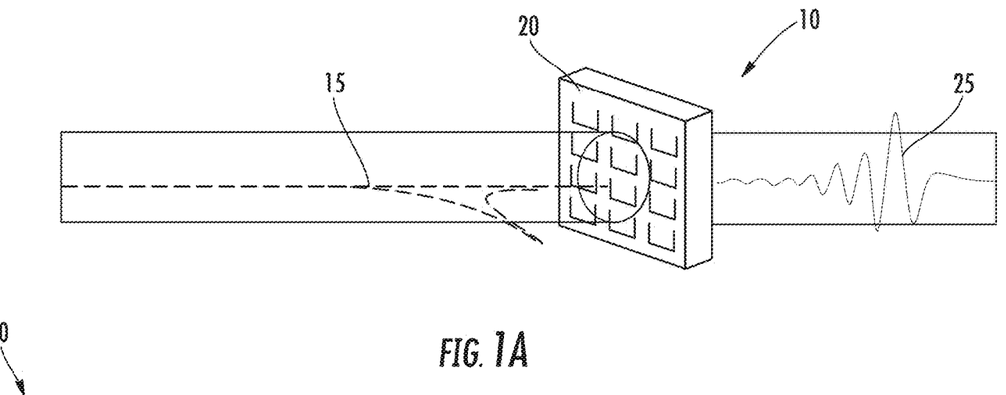
FIG. 1A provides a schematic illustration of THz generation.
Figure 4:
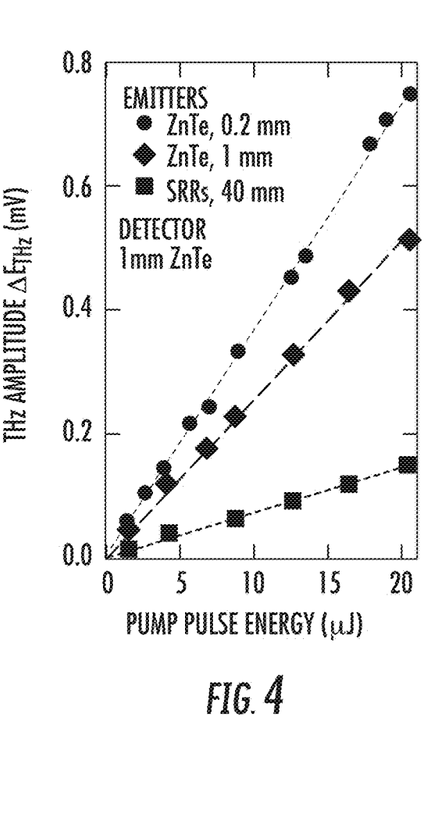
FIG. 4 depicts a graph of THz amplitude as a function of pump pulse energy for various emitters of various thicknesses.
Figure 5:
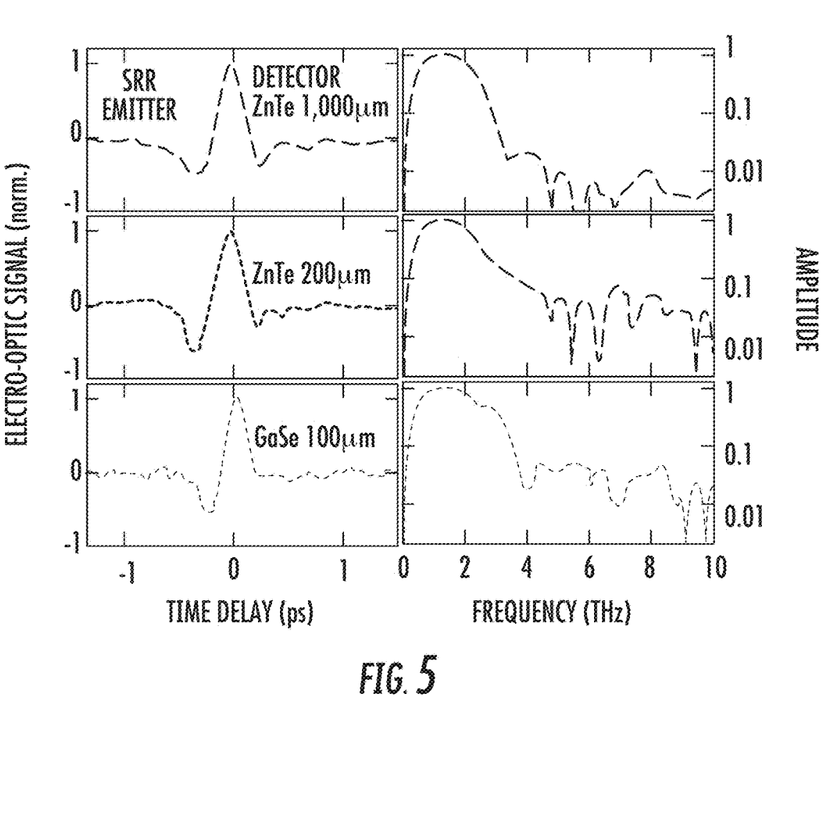
FIG. 5 depicts graphs comparing the electro-optical and bandwidth frequency for various emitters.

FIG. 1A schematically illustrates an embodiment 10 of the present invention and shows key elements. Generally, electromagnetic radiation (EMR) 15, which is preferably spatially coherent, such as a laser beam, is directed onto an array 20 of SSRs, which produces EMR radiation in the THz spectrum, referred to herein as THz emission, 25. In one embodiment, the EMR 15 is initially produced using a Ti:sapphire amplifier, having a center wavelength 800 nm, pulse duration 35 fs, and repetition rate 1 kHz. The main portion of the output from the amplifier is used to pump an optical parametric amplifier (OPA) to produce tunable near-infrared (NIR) radiation from 1100-2600 nm of about 140 fs pulse duration. The NIR radiation from the OPA is used as the generation EMR 15 to pump the metamaterial emitter, i.e., SSR array 20, made of a single layer of SRRs. In an embodiment, each of the SSRs has a thickness of approximately 40 nm. This generates THz pulses in the far-infrared spectrum (FIR), which are the THz emissions 25. The THz emissions 25 were detected by focusing the pulses onto the ZnTe or GaSe detector using a parabolic mirror (PM). Residual scattered NIR radiation from the pump pulse was removed from the THz signal by a Teflon filter before the detector. Additionally, a wire grid polarizer was used to measure the polarization of generated THz pulses. In addition, a small portion of the amplifier output was used as a sampling beam to detect the emitted THz pulses via the electro-optic sampling of the ZnTe or GaSe detectors (FIGS. 4 and 5).

Figure 1B:
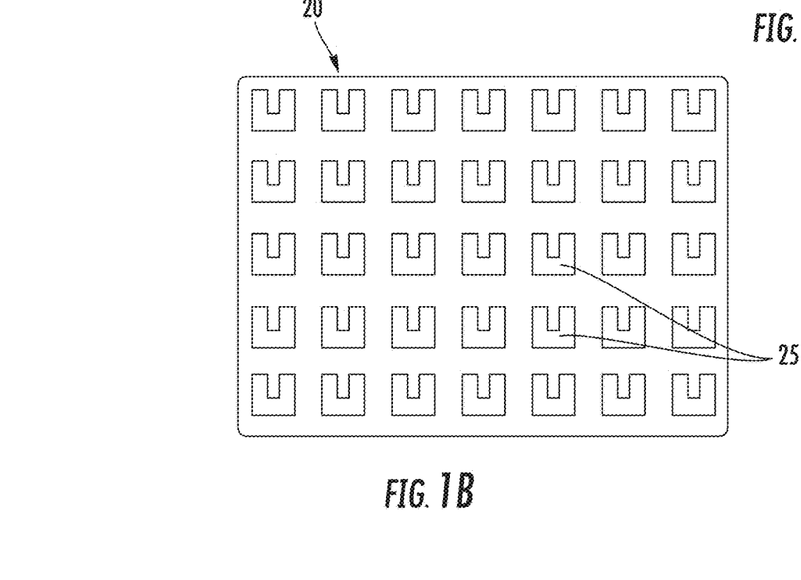
FIG. 1B depicts an SSR array.
Figure 1C:
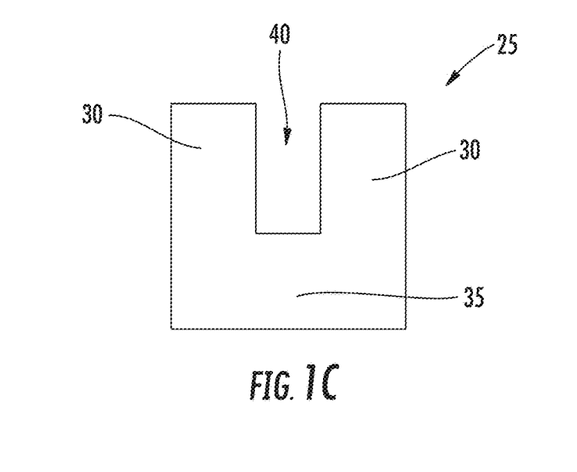
FIG. 1C depicts an individual SSR.

A schematic representation of the metamaterial SRR array 20 of this embodiment is shown in FIG. 1B. The array 20 was fabricated using electron-beam lithography and high vacuum evaporation of gold, followed by a lift-off procedure. The SSRs 25 were deposited on an indium-tin-oxide (ITO) layer, having a thickness of approximately 5 nm, which was supported on a suprasil substrate. In this embodiment, the single layer of SRRs 25 was 40 nm thick. The square lattice constant was 382 nm. The total size of the SRR array 20 was approximately 5 mm×5 mm. FIG. 1C depicts a single SRR 25. The SSR 25 is substantially u-shaped, i.e., comprised of two substantially parallel arm regions 30 and a base region 32 with a gap 40 between the two parallel arm regions 30. The ideal SSR 25 was designed such that the width of each arm region 30 was approximately 79 nm and that the length of the base region 35 was approximately 220 nm. The width of the base region 35 was approximately 90 nm, and the length of the arm (i.e., distance from tip to base region 35) was 122 nm for a total vertical side length of 212 nm. In producing the entire array 20 of SSRs 25, small deviations from the ideal SSR 225 were encountered.

Figure 2:
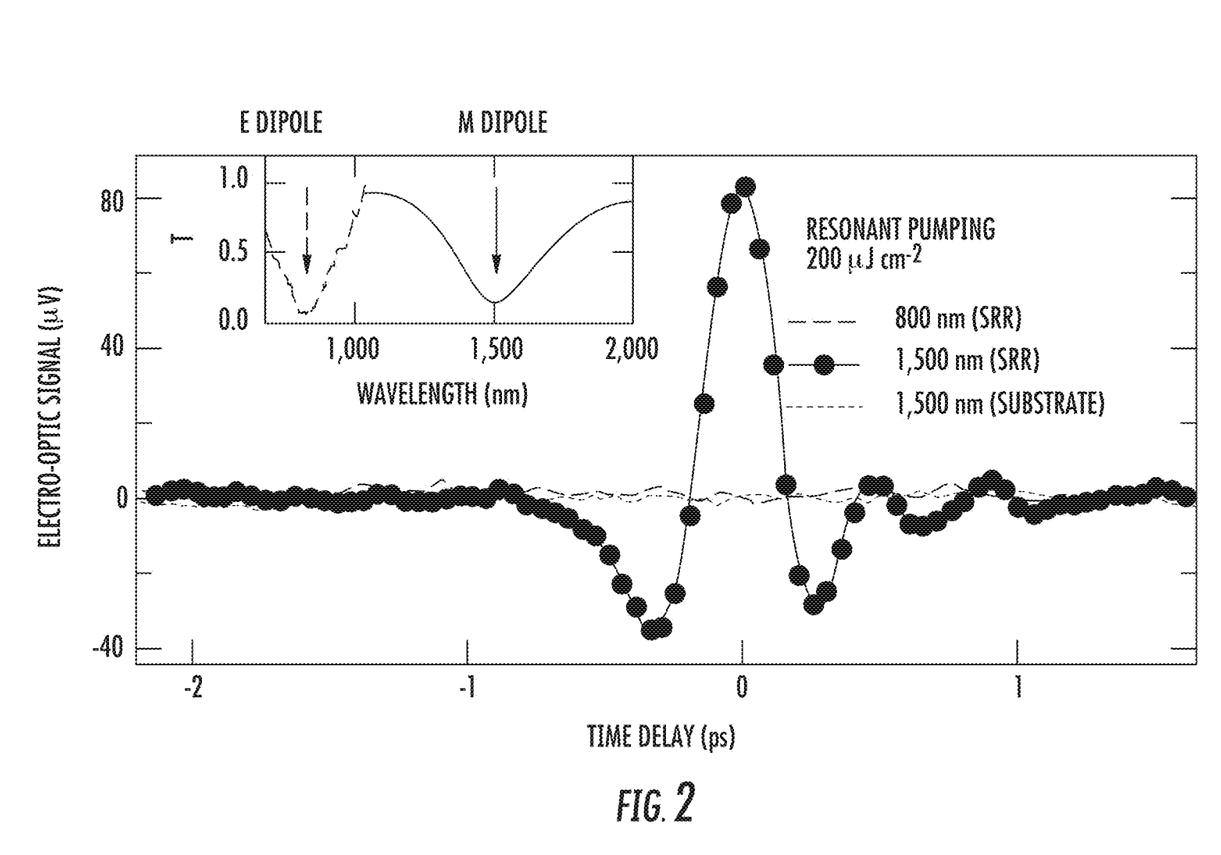
FIG. 2 depicts a graph of the electro-optic signal as a function of time delay for various incident wavelengths on the SSR and substrate.

FIG. 2 shows the typical time-domain THz traces, $E_{THz}$, during a 4 ps interval and under pump fluence of 200 μJ/cm² for two pump wavelengths: 1500 nm (200 THz) centered at the magnetic-dipole resonance and 800 nm (375 THz) at the electric-dipole resonance, respectively (inset, FIG. 2). This clearly shows THz generation exclusively from pumping the magnetic-dipole resonance (black dots), while there is negligible THz signal from pumping the electric-dipole resonance of the SRRs. Note they are measured with the polarization of the incident light either perpendicular (electric) or parallel (magnetic) to the gap of SRRs. In addition, the polarization state of the emitted THz pulses was characterized to be perpendicular to the gap of the SRRs with a wire grid polarizer after the sample, again pointing to the magnetic dipole origin of the emitted THz pulses from the second-order nonlinear optical rectification.

Figure 3:
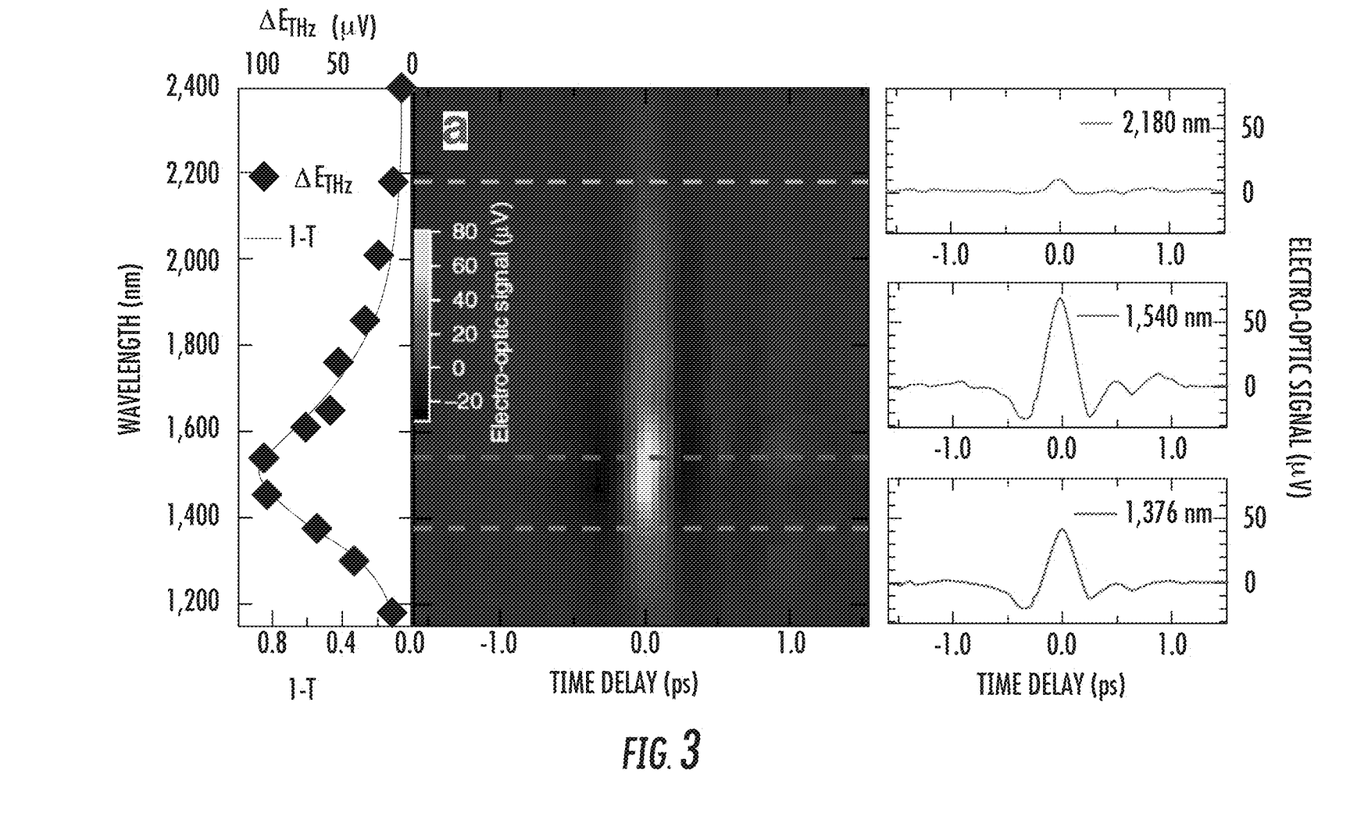
FIG. 3 depicts the pump-wavelength dependence of THz generation from the SRR metamaterial, including a two-dimensional false-color plot of the THz temporal traces for sweeping the pump wavelength across the magnetic-dipole resonance.

FIG. 3 provides a false-color plot and time-domain THz traces, showing the detailed excitation-wavelength dependence. Resonant photoexcitation of the magnetic-dipole resonance ~1540 nm leads to significant enhancement of the THz emission, as shown in FIG. 3. The corresponding time-domain trace for the on-resonance pumping is plotted in the red-line graph to the right of the false-color plot. The conversion efficiency quickly decreases under off-resonance pumping, which is shown by the reduction of the THz emission for excitation both below and above the magnetic-dipole resonance, at 2180 nm (green-line graph) and 1376 nm wavelength (pink-line graph), respectively. The peak-to-peak amplitudes of THz emission $\Delta E_{THz}$ (shown in the diamond plot to the left of the false-color plot) closely track the absorption around the magnetic dipole resonance, as shown in 1-T curve, where T is the linear optical transmission of the sample. All of these observations corroborate the resonant THz generation by the fundamental magnetic SRR resonance.

FIG. 4 plots the peak-to-peak amplitude of THz electric field $\Delta E_{THz}$ versus pump power for the one-layer metamaterial emitter of 40 nm (squares), which are compared with two ZnTe emitters with thickness of 1 mm (diamonds) and 0.2 mm (dots). The THz signals for the three emitters are measured at the same pump fluence and same ZnTe detector of 1 mm inch thickness with 800 nm sampling wavelength. For the ZnTe emitters pumped at 1500 nm, the optimal thickness for the maximum THz emission is one coherent length $L_c$~0.2 mm and increasing crystal thickness beyond that actually decreases the emission intensity, as seen in the 1 mm case. This effect can be understood as a mismatch between group velocity of the optical generation pulse and phase velocity of the emitted THz pulse in the ZnTe emitters, which results in a walk-off effect between the two beams.

After propagating one coherent length $L_c$, the superposition of the emitted THz pulses from different sheets will have destructive interference in the ZnTe. Most intriguingly, FIG. 4 reveals a remarkably efficient THz generation from the single layer SRR emitter with emission intensity on the same order of ZnTe emitters that are 5000 times thicker, i.e., the SRRs generate THz radiation roughly ⅕ of the maximum from the 0.2 mm ZnTe. The emitted THz electric field scales linearly with the pump power which supports the second order nonlinear optical rectification process.

Knowing the ratio between slopes of the SRR and ZnTe emitters, one can unambiguously determine the nonlinear second order susceptibility of a single layer of SRRs to be ~0.8×10⁻¹⁶ m²/V, which far exceeds sheet or surface nonlinearities of both thin films and bulk crystals. In addition, SRR emitters can be pumped at various wavelengths by tailoring the magnetic dipole resonance without sacrificing the walk-off and phase matching issues, which restrict pump photon energies of nonlinear crystals such as ZnTe/GaSe/GaP/GaAs.

FIG. 5 consists of plots of normalized temporal profiles of THz electric field pulses and corresponding spectral amplitudes from a single layer SRR emitter. The plots display THz detectors of 1 mm ZnTe (top two plots), 0.2 mm ZnTe (middle plots), and 0.1 mm GaSe detector (bottom plots). These plots demonstrates the THz bandwidth of the SRR emitter up to 4 THz which is limited mostly by the excitation pulse duration ~140 fs (spectral width ~13 meV or 3.2 THz) and Reststrahlen region of the inorganic nonlinear detectors (centered ~5-6 THz). The disclosed method and emitter can generate much higher THz bandwidth by shortening pump pulses because the single layer SRR emitter does not suffer from the intrinsic limitation of the Reststrahlen region found in almost all inorganic THz emitters/sensors.

Figure 6A:
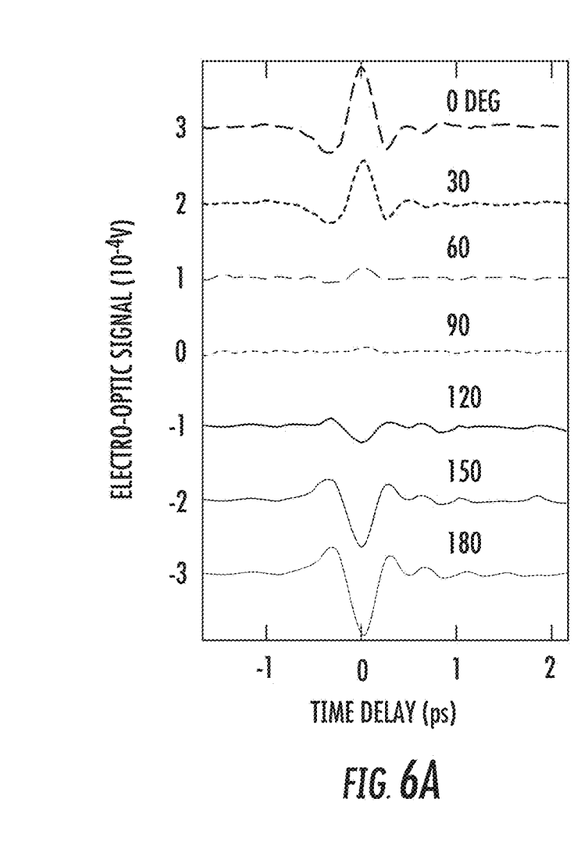
FIG. 6A depicts the electro-optical signal as a function of time delay for an SSR that has been rotated from 0 to 180 degrees with respect to an incident beam.
Figure 6B:
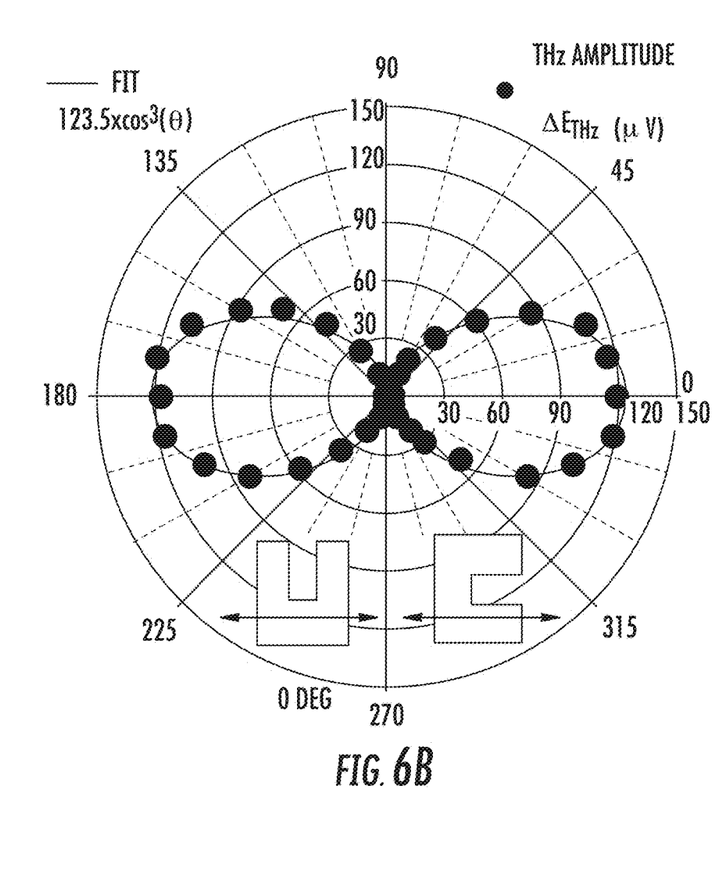
FIG. 6B depicts a radial plot of electro-optical signal for an SSR rotated from 0 to 360 degrees with respect to an incident beam.
Figure 6C:
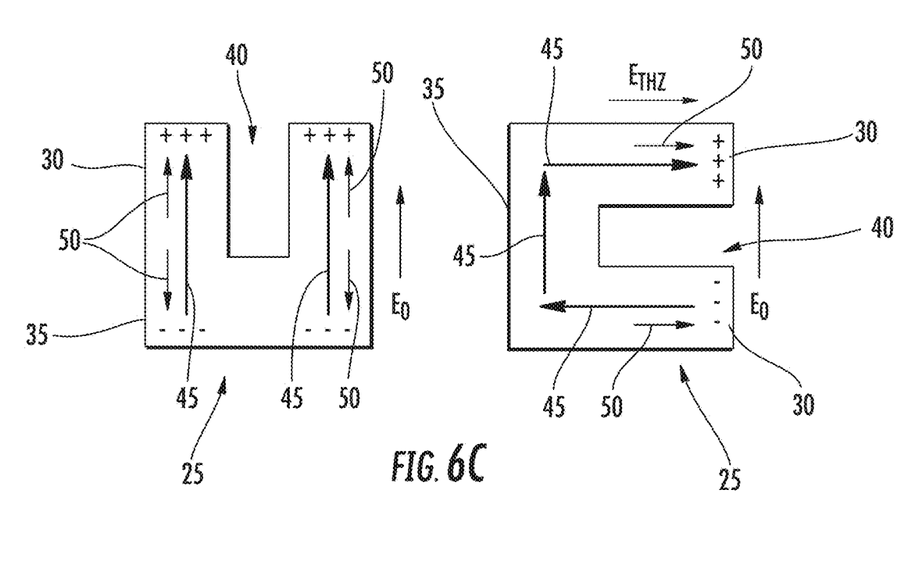
FIG. 6C depicts the distributions of linear current and nonlinear polarization for an SSR based on orientation with respect to an incident beam.

FIGS. 6A-C show the control of the amplitude and phase of THz emission by varying relative polarization by rotating the SRR emitter. As shown in FIG. 6B, the polarization angle is defined to be 0 degree when the polarization of pump beam is parallel to the gap 40 of the SRR 25, and 90 degrees for the orthogonal polarization. FIG. 6A plots 7 traces by varying the SRR emitters from 0 to 180 degree under 1500 nm pumping (traces are offset for clarity). The plots show that the THz emission amplitude is changed from maximum at 0 degree, negligible at 90 degree, and back to maximum at 180 degrees with a π phase shift from the origin.

The complete polarization dependence of the emission amplitude is shown as a polar graph in FIG. 6B where the peak-to-peak amplitude of THz signal is plotted as a function of the rotation angle. The amplitude is best fitted with a $\cos^3(\theta)$ function, where a $\cos^2(\theta)$ dependence is from the polarization between the pump beam and the gap of the SRR, and the other $\cos(\theta)$ is from the detection ZnTe crystal. In short, the detector is aligned such that it measures vertically polarized THz pulses at maximum efficiency and horizontally polarized THz pulse at minimum efficiency, and the efficiency follows a $\cos(\theta)$ function as the polarization of THz pulses changes from vertical to horizontal. These clearly corroborate the conclusions of both the nonlinear optical rectification mechanism and polarization state of the THz emission.

FIG. 6C shows the distributions of the linear current (arrows 45) and nonlinear polarization (arrows 50) for the SSRs arranged at the electric resonance (left) and electrically excited magnetic resonance (right). The + and − indicate charge accumulation. It can be seen that the SSR on the right exhibits an appreciable THz via optical rectification due to the broken symmetry.

As a result, efficient broadband single-cycle THz pulse generation was demonstrated from an embodiment of the present invention having a single layer of SRR emitters. Such efficient and compact THz source is expected to be useful for many applications including, but not limited to, e.g., integrated nano-photonics and nanoelectronics circuits, high-speed information and communication technology, ultrasmall noninvasive biological and medical evaluation device, etc.

Having discussed the construction and experimentation of an embodiment of the present invention in some detail, above, the following will now provide additional details regarding the materials and methods employed, particularly with regard to the optical measurement.

In the embodiment introduced above, a Ti: Sapphire amplifier was used with center wavelength 800 nm, pulse duration 35 fs at 1 kHz repetition rate. The main portion of the output from the amplifier is used to pump the optical parametric amplifier (OPA) to produce tunable near-infrared radiation from 1100-2600 nm with ~140 fs pulse duration, which serves as a generation beam to pump the SRR/ZnTe emitter. The generated THz pulses were then focused onto the ZnTe or GaSe detector by a parabolic mirror. Residual scattered NIR radiation from the pump pulse was removed from the THz signal by a Teflon filter before the detector. The other small portion of the output from the amplifier was used as a sampling beam to detect the THz pulses via the electro-optic sampling of the detector crystals. The THz section of the setup was purged with dry $N_2$ gas.

The wire grid polarizer discussed above was used only for the determination of the polarization. For polarization dependence measurement, the SRR emitter was rotated while the near-infrared pump beam remained fixed, so that the polarization of generated THz pulses is rotated together with SRR emitter accordingly. In addition, the detection ZnTe crystal is also polarized, which explains the $\cos^3(\theta)$ fitting used in FIG. 6B.

Figure 7:
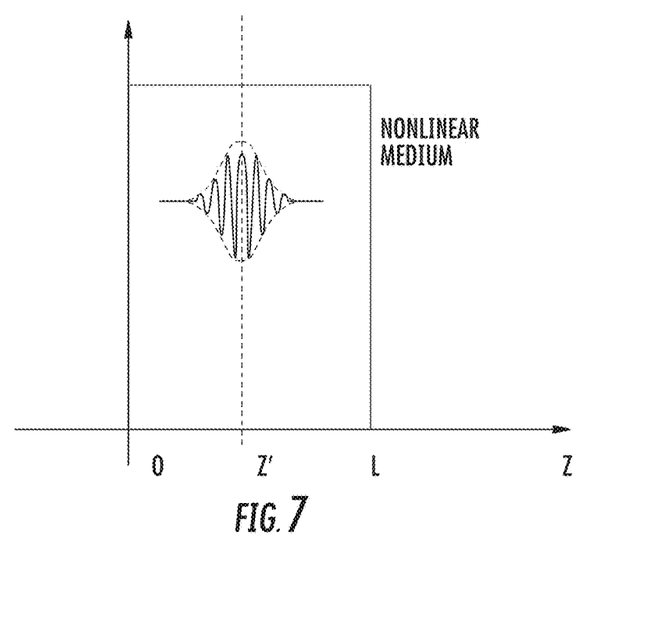
FIG. 7 depicts a Gaussian optical pulse propagated along the z-axis in a nonlinear medium having a thickness L.

The procedure utilized to extract the second-order nonlinear susceptibility of a single layer SRR emitter is now discussed. This procedure starts with the wave equation in a nonlinear medium propagating in z-axis as:

$$\frac{\partial^2 E_T(z,t)}{\partial z^2} - \frac{n_T^2}{c^2}\frac{\partial^2 E_T(z,t)}{\partial t^2} = \frac{1}{\varepsilon_0 c^2}\frac{\partial^2 P_T^{(2)}(z,t)}{\partial t^2} = \frac{\chi^{(2)}}{c^2}\frac{\partial^2 |E_0(z,t)|^2}{\partial t^2} \quad (1)$$

where $E_T(z,t)$ is the generated THz field, $n_T$ the refractive index of THz pulses in the nonlinear medium, $\varepsilon_0$ the free space permittivity, c the speed of light, $P_T^{(2)}(z,t)$ the second-order polarization of the nonlinear medium due to the optical pump beam $E_0(z,t)$, and $\chi^{(2)}$ the second-order nonlinear susceptibility of the nonlinear medium. As shown in FIG. 7, a Gaussian optical pump pulse propagating in a nonlinear medium is defined, and at z=z' the optical pulse field amplitude can be expressed as $$E_0(z',t) = E_0 e^{-\frac{(t-z'/v_0)^2}{\tau^2}}$$

where $v_0$ is the group velocity of the optical pump pulse in the medium and $\tau$ is the optical pulse duration, which is 140 fs in our case. THz radiation generated from an infinitesimal thin layer of the nonlinear medium z=z' can be expressed as $$E_T(z',t) = A\chi^{(2)}(1-2x^2/\tau^2)e^{-x^2/\tau^2}$$

where $$x = t - \frac{z'}{v_0} - \frac{L-z'}{v_T}$$

A is a constant, L the thickness of the medium, and $v_T$ the phase velocity of THz pulses in the medium. Consequently, the THz field generated from a single sheet of SRRs can be obtained as $$E_T^{SRR}(t) = A\chi_{SRR}^{(2)}(1-2t^2/\tau^2)e^{-t^2/\tau^2} \quad (2)$$

In a thick nonlinear medium, the THz field generated can be obtained by taking the integration of the sheet result over the thickness. For a 0.2 mm thick ZnTe crystal, we have:

$$E_T^{ZnTe}(t) = \quad (3)$$
$$\int_0^{L=0.2mm} E_T(z',t)dz' = \int_0^{L=0.2mm} A\chi_{ZnTe}^{(2)}(1-2x^2/\tau^2)e^{-x^2/\tau^2}dz'$$
$$= \frac{Ac\chi_{ZnTe}^{(2)}}{n_T - n_0}\int_{t-2.17ps}^{t-1.88ps}(1-2x^2/\tau^2)e^{-x^2/\tau^2}dx$$
$$= A\chi_{ZnTe}^{(2)}(6.98\times 10^{-4} m/ps)[(t-1.88ps)e^{-(t-1.88ps)^2/\tau^2} -$$
$$(t-2.17ps)e^{-(t-2.17ps)^2/\tau^2}]$$

Figure 8:
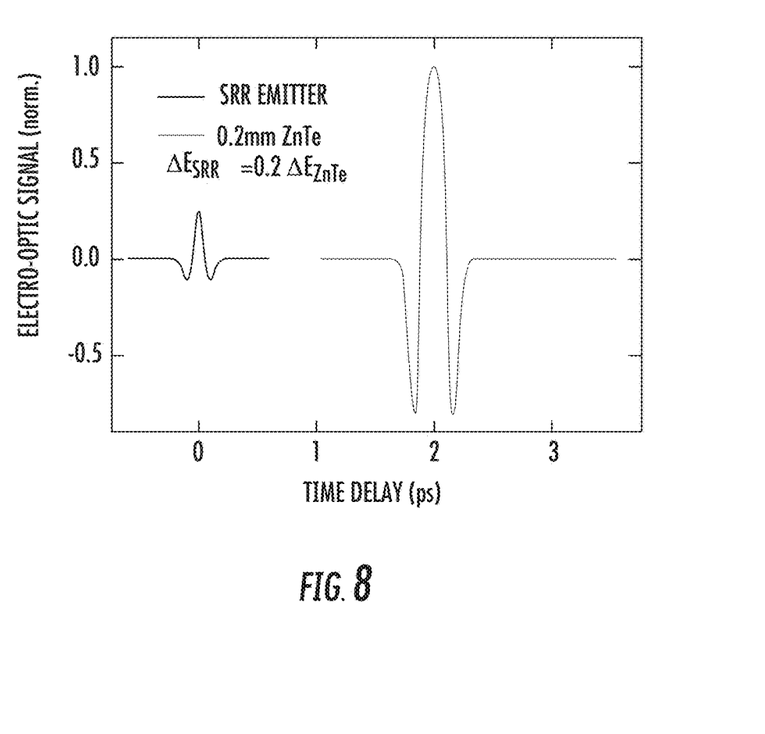
FIG. 8 depicts the theoretical calculation of the THz fileds generated from a single layer SSR emitter as compared to a 0.2 mm ZnTe emitter.

In the calculation, the central frequency of the THz spectrum 2 THz is used to calculate the refractive index of THz in ZnTe, i.e., $n_T = n_T(2\text{ THz}) = 3.25$, and the group refractive index of optical pump beam at 1500 nm is $n_0 = n_{gr}(1500\text{ nm}) = 2.82$. Knowing the measured peak-to-peak amplitudes $\Delta E_T^{SRR} \approx 0.2 \times \Delta E_T^{ZnTe}$ and $\chi_{ZnTe}^{(2)} = 2r_{41} = 8 \times 10^{-12}$ m/V, where $r_{41} = 4 \times 10^{-12}$ m/V is the electro-optic coefficient of ZnTe, $\chi_{SRR}^{(2)}$ can be extracted from simulated THz electric fields using equations 2 and 3 as shown in FIG. 8, where $\chi_{SRR}^{(2)} = 0.8 \times 10^{-16}$ m$^2$/V reproduces the experimental peak-to-peak ratio. Therefore, a gigantic resonant sheet nonlinear susceptibility of SRRs is revealed, which is three orders of magnitude higher than the typical surface and sheet values. For example, typical surface values are in the range of $10^{-22}$ m$^2$/V ~ $10^{-21}$ m$^2$/V for fused silica or BK7 glass, ~$10^{-19}$ m$^2$/V for liquid crystals, inorganic and organic thin films.

With this understanding of the experimentation methods and materials in hand, it is instructive to review the theory associated with embodiments of the present invention. Indeed, the observed THz emission from the SRR sample is due to difference-frequency generation (DFG) by the second order non-linear electric response arising from the electrons in the metal that makes up the SRR. The electron gas in the metal can be described by a hydrodynamic model know as Maxwell-Vlassov theory, which goes beyond the usual linear Drude model for the metallic response and contains second order nonlinearities:

$$\partial_t j = \frac{ne^3}{m}E - \gamma j - \frac{e}{m}(E\text{div}E + j \times B) + \frac{1}{ne}(j \cdot \text{grad})j + \frac{e}{m}\text{grad } p,$$

$$p(n) = \frac{1}{5}(3\pi^2)^{2/3}\frac{\hbar}{m}n^{5/3}$$

The first two terms are the linear response as described by the Drude model, and the following terms are the non-linear response of the electrons and represent Lorentz force, convective acceleration, and Fermi pressure.

The main non-linear contributions are the E divE and (j·grad)j terms, which do not contribute in the bulk but do contribute on surfaces. Qualitatively, both terms behave like jρ, current times accumulated density on the surface. As a consequence the non-linear current is parallel or antiparallel to the linear current induced by the external excitation in regions of increasing or decreasing surface charge, respectively. Therefore, in the case of a simple straight nanorod, the radiation caused by the non-linear current contribution in the two regions of surface charge accumulation (i.e. both ends of the nanorod) is out of phase, interferes destructively, and is not observed in the far field. Similarly, the symmetry of the current distribution at the electric-dipole resonance of the SRR (left, FIG. 6C) cannot induce radiation either. If, however, the nanorod is bent into an U-shaped SRR and excites the magnetic resonant mode as shown in the right illustration of FIG. 6C, the non-linear current in both arms are now parallel, their radiated fields interfere constructively and are observed in the far field. This holds for both SHG and DFG, the latter being responsible for the THz generation in the experiment discussed above.

In first approximation the temporal optical input signal can be described as a linearly chirped Gaussian pulse, $$G(t) = e^{i(\psi t^2 + \Omega t + \phi)} h_{\sigma_0}(t) + e^{-i(\psi t^2 + \Omega t + \phi)} h^*_{\sigma_0}(t), \psi, \Omega, \phi, \sigma_0 \in \mathbb{R}, \sigma_0 > 0;$$

$$\text{where } h_\sigma(t) = \frac{1}{2} e^{-\frac{1}{2}\sigma^2 t^2} \Leftrightarrow h_\sigma(\omega) = (2\sigma\sqrt{2\pi})^{-1} e^{-\frac{\omega^2}{2\sigma^2}} \text{ and } \mathrm{Re}\sigma^2 > 0.$$

The linear chirp $\alpha = 2\psi/\sigma_0^2$ is just a redefinition of $\sigma = \sigma_0 \sqrt{1-i\alpha}$ is and can be obtained from the difference in spectral width of the measured power spectrum of the pump pulse ($\sigma \approx 2\pi \times 9$ THz) and the temporal width of the pump pulse derived from a cross-correlation measurement ($\sigma_0 \approx 2\pi \times 2$ THz). $\Omega$ is the center frequency of the pump pulse and $\phi$ a phase shift between carrier and envelope.

$$G(t) = e^{i(\Omega t+\phi)} h_\sigma(t) + e^{-i(\Omega t+\phi)} h_\sigma^*(t) \Leftrightarrow G(\omega) = e^{i\phi} h_\sigma(\omega-\Omega) + e^{-i\phi} h_\sigma^*(-\omega-\Omega)$$

where $\sigma = \sigma_0 \sqrt{1-i\alpha}$, $$\alpha = \frac{2\psi}{\sigma_0^2}.$$

with the second non-linear response being proportional to $$G^{(2)}(t) = 2h_{\sigma_0}^2(t) + e^{i(2\Omega t + 2\phi)} h_\sigma^2(t) + e^{-i(2\Omega t + 2\phi)}[h_\sigma^2(t)]^* \Leftrightarrow$$

$$G^{(2)}(\omega) = \frac{1}{2}\left(2h_{\sqrt{2}\sigma_0}(\omega) + e^{2i\phi} h_{\sqrt{2}\sigma}(\omega - 2\Omega) + e^{-2i\phi} h^*_{\sqrt{2}\sigma}(-\omega - 2\Omega)\right).$$

The DFG is the first term in the spectrum above. The other two summands represent the SHG, which is removed from the signal by the Teflon filter in the THz signal path and by the detector crystals acting as an effective low-pass filter. Note that the chirp drops out and the DFG signal only depends on the temporal envelope of the pump pulse.

The radiated THz field can be written in terms of a $\chi^{(2)}$ polarizability of the SRR sample:

$$E_{rad}^{(nl)}(\omega) \sim \chi^{(2)}(-i\omega)^2 G^{(2)}(\omega) \Leftrightarrow$$

$$E_{rad}^{(nl)}(t) \sim \chi^{(2)} \mathcal{F}^{-1}[-(-i\omega)^2 G^{(2)}(\omega)] \sim -\chi^{(2)} \partial_t^2 h_{\sqrt{2}\sigma_0}(t).$$

The time derivative in the radiated fields suppresses zero-frequency components such that the THz spectrum has a peak at finite frequency, $$E_{rad}^{(nl)}(\omega) \sim \chi^{(2)} \omega^2 e^{-\frac{\omega^2}{4\sigma_0^2}} \Leftrightarrow E_{rad}^{(nl)}(t) \sim \chi^{(2)} \sigma_0^2 (1 - 2\sigma_0^2 t^2) e^{-\sigma_0^2 t^2}.$$

The THz spectrum peaks at $\omega = 2\sigma_0$ and has a bandwidth $\Delta\omega_{FWHM} \approx 2.31\ \sigma_0$.

Strictly, the radiated non-linear fields are given by the currents in the SRR, which are proportional to the reflection amplitude of the electric sheet given by the SRR metasurface. So in the formulas above we have $G(\omega) \sim R(\omega) G^{(in)}(\omega)$. From the linear transmittance measurements of the SRR we get $R(\omega) \approx Z\sigma_e(\omega)/[2+Z\sigma_e(\omega)]$ with $Z\sigma_e(\omega) \approx -i\alpha\omega/(\beta^2 - \omega^2 - i\gamma\omega)$ where $\alpha \approx 384$, $\beta \approx 2\pi \times 199$ THz, and $\gamma \approx 2\pi \times 15.4$ THz. Thus, since the SRR resonance is very wide compared to the bandwidth of the optical pump pulse envelope ($\sigma_0 \approx 2\pi \times 2$ THz) the effect of R ($\omega$) on the THz pulse shape is negligible: In our experiments, the achievable THz bandwidth is limited by the duration of the optical pump pulse, not the SRR response.

The bandwidth and, in particular, the upper cut-off frequency (lowpass, between 2 and 3 THz depending on the used crystal) of the detectors is much smaller than the expected THz signal. As a consequence, the spectrum of the observed THz signal in the experiments is not limited by the DFG but essentially given by the bandwidth of the detectors. The so predicted THz waveform agrees well with the experimental observation.

All references, including publications (including but not limited to Luo et al. "Broadband Terahertz Generation from Metamaterials." *Nature Communications* 5:3055 DOI: 10.1038/ncomms4055 (2014)), patent applications, and patents cited herein are hereby incorporated in their entireties by reference thereto to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A terahertz (THz) emitter comprising:
   an array of split-ring resonators (SRRs) configured to produce emissions of electromagnetic radiation (EMR) in the THz spectrum between about 0.1 THz and about 10 THz upon energization by pulses of EMR having a wavelength of between about 1.1 µm to about 2.6 µm.

2. The THz emitter of claim 1, wherein the array of SRRs is configured to produce emissions of EMR upon energization by pulses of EMR that last between about 100 and about 200 femtoseconds (fs).

3. The THz emitter of claim 1, wherein the array of SRRs is configured to produce emissions of EMR in the THz spectrum that have a bandwidth of at least 4 THz.

4. The THz emitter of claim 1, wherein the SRRs are configured to exhibit a nonlinear susceptibility between about $10^{-17}$ and about $10^{16}$ $m^2/V$.

5. The THz emitter of claim 1, wherein the SRRs are comprised of gold.

6. The THz emitter of claim 1, wherein each SRR has two substantially parallel arm regions joined by a base region that is substantially perpendicular to the parallel arm regions such that a gap is created between the parallel arm regions.

7. The THz emitter of claim 6, wherein the parallel arm regions have a width of approximately 79 nm and the perpendicular base region has a length of approximately 220 nm.

8. The THz emitter of claim 7, wherein each SRR is at most approximately 40 nm thick.

9. The Thz emitter of claim 1, wherein the SRRs are arranged in a single layer within the array.

10. The THz emitter of claim 1, wherein the array of SRRs is configured to produce emissions of EMR upon energization by pulses of EMR having a wavelength of between about 1.3 µm to about 1.8 µm.

11. The THz emitter of claim 1, wherein the array of SRRs is formed on a layer of indium-tin-oxide.

12. The THz emitter of claim 11, wherein the layer of indium-tin-oxide is deposited on a quartz substrate.

13. The THz emitter of claim 1, wherein the array of SRRs is configured to produce emissions of EMR upon energization by pulses of EMR that last for about 140 fs.

14. A method of producing electromagnetic radiation (EMR) in the terahertz (THz) spectrum between about 0.1 THz and about 10 THz, the method comprising the steps of:
   providing an array of split ring resonators (SRRs), wherein the SRRs have a magnetic dipole resonance;
   providing an electromagnetic radiation (EMR) source, wherein electromagnetic radiation (EMR) from the EMR source has a wavelength within +/−25% of the magnetic dipole resonance of the SRR; and
   pulsing the EMR from the EMR source on the array of SRRs in pulses that last between about 100 and about 200 femtoseconds (fs).

15. The method of claim 14, wherein the SRRs are arranged in a single layer within the array.

16. The method of claim 14, wherein the SRRs are comprised of gold and wherein each SRR has two substantially parallel arm regions joined by a base region that is substantially perpendicular to the parallel arm regions such that a gap is created between the parallel arm regions.

17. The method of claim 14, wherein the EMR from the EMR source has a wavelength of between about 1.3 µm to about 1.8 µm.

18. The method of claim 14, wherein the SRRs exhibit a nonlinear susceptibility between about $10^{-17}$ and about $10^{-16}$ $m^2/V$.

19. The method of claim 14, wherein each SRR is at most approximately 40 nm thick.

* * * * *

UNITED STATES PATENT AND TRADEMARK OFFICE
CERTIFICATE OF CORRECTION

PATENT NO. : 9,684,221 B2
APPLICATION NO. : 14/989565
DATED : June 20, 2017
INVENTOR(S) : Liang Luo et al.

Page 1 of 1

It is certified that error appears in the above-identified patent and that said Letters Patent is hereby corrected as shown below:

In the Claims

Claim 4, Line 3, delete "$10^{16}$ m$^2$/V." and replace with --$10^{-16}$ m$^2$/V.--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*